United States Patent [19]

Pinkerton et al.

[11] Patent Number: 4,816,057
[45] Date of Patent: Mar. 28, 1989

[54] GLASS PRESS FORMING MACHINE

[75] Inventors: Steven J. Pinkerton, Ridgefield; John P. Mungovan, Simsbury; John E. Suomala, Weatogue; Steven A. Austin, Vernon, all of Conn.

[73] Assignee: Emhart Industries, Inc., Farmington, Conn.

[21] Appl. No.: 152,686

[22] Filed: Feb. 5, 1988

[51] Int. Cl.⁴ .................... C03B 7/08; C03B 11/16
[52] U.S. Cl. ............................. 65/164; 65/75; 65/163; 65/330
[58] Field of Search ............ 65/75, 163, 164, 330

[56] References Cited

U.S. PATENT DOCUMENTS

| | | | |
|---|---|---|---|
| 1,532,254 | 4/1925 | Miller | 65/164 X |
| 3,192,027 | 6/1965 | Wilhelm | 65/164 X |
| 4,551,163 | 11/1985 | Duga et al. | 65/164 X |

Primary Examiner—Arthur Kellogg
Attorney, Agent, or Firm—Spencer T. Smith

[57] ABSTRACT

The individual needles of a glass feeder mechanism which control the volume of the streams of molten glass sheared into discrete gobs are displaceable to adjust the size of the sheared gobs. The controller for the motor, which raises or lowers a stream, receives positional data from the plunger, which forms the gob into a parison, and determines the Parison Formation Point for that parison and raises or lowers the needle to maintain that point at a desired plunger location.

3 Claims, 2 Drawing Sheets

GLASS PRESS FORMING MACHINE

The present invention relates to the simultaneous forming of gobs of molten glass into parisons in a multi-gob, individual section, glass forming machine.

It is an object of the present invention to increase the uniformity of product made by such multi-gob, individual section, glass forming machines.

Other objects and advantages of the present invention will become apparent from the following portion of the specification and from the following drawings, which illustrate in accordance with the mandate of the patent statutes, a presently preferred embodiment incorporating the principles of the invention.

Referring to the drawings.

Figure 1:
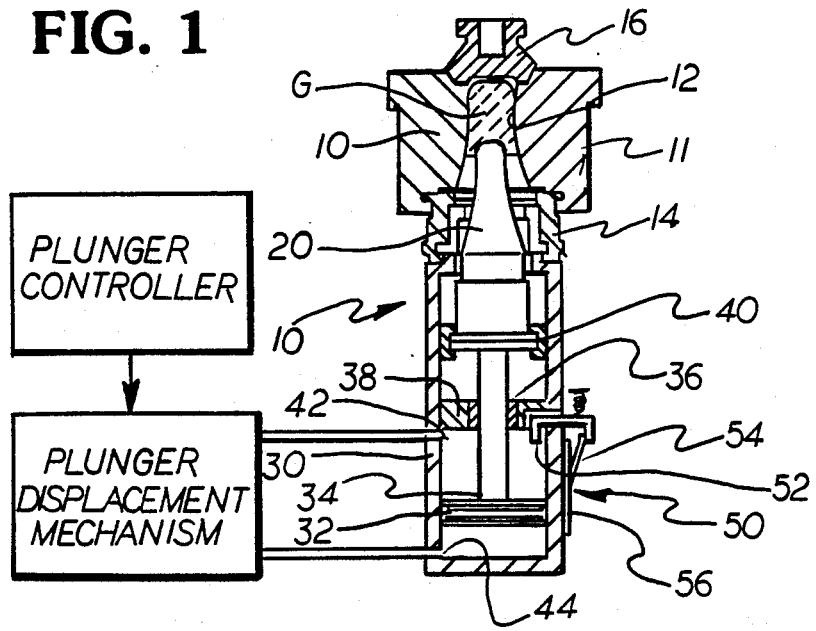
FIG. 1 is a diagrammatic view of one of the parison mold assemblies of an individual section, glass forming machine.

A glassware forming machine of the individual section, multi-gob type, has a number of individual sections each having a selected number (usually 2, 3 or 4) of parison mold assemblies 10 for simultaneously forming a corresponding number of parisons. Each of these mold assemblies 10 includes two mold halves 11 which are movable between an advanced position where they engage one another and other parts of the mold assembly to form a mold cavity 12 and a retracted position where the mold halves 11 are spaced to permit removal of a formed parison. A neck ring 14 cooperates with the mold halves 11 to define the cavity 12 and is arranged to grip the neck portion of a formed parison so that the parison can be transferred from the mold cavity to a blow mold. A baffle 16, movable into a position on top of the engaging mold halves 11, defines the upper surface of the mold cavity and is moved to a remote location prior to parison removal.

Each mold assembly also has a plunger mechanism including a plunger 20. The plunger 20 is first moved from its out-of-the-way position to its intermediate position where the plunger projects upwardly into the mold cavity. A gob of molten glass is dropped into the mold cavity 12 and rests on the plunger 20. The plunger is then advanced under a variable feed pressure from this intermediate position to press the glass against the walls of the cavity 12 to form the parison. In FIG. 1 the plunger is shown during its advancement from the intermediate position to its fully advanced position. The plunger is then retracted to its intermediate position by cutting the feed pressure and applying a retract pressure and then retracted from the intermediate position to the out-of-the-way position to allow for removal of the parison.

The plunger mechanism also has a cylinder 30, a piston 32 movable in the cylinder 30, and a piston rod 34 projecting from the piston 32 through a seal 36 in an upper end cap 38 of the cylinder 30. The plunger 20 is mounted on an upper end portion of the piston rod 34 by a clamping ring 40. Pressurized hydraulic fluid introduced into the cylinder 30 through an upper entry port 42 causes the piston 32 to move downwards in the cylinder 30, and the introduction of the fluid through port 44 causes the piston 32 to move upwardly in the cylinder 30.

Each parison mold assembly also has a Plunger Displacement Mechanism (a valving arrangement which can alternately apply the feed and retract pressures to the appropriate cylinder ports 42, 44). The time when each pressure is applied and other control parameters such as duration of application are controlled by a Plunger Controller.

A feeder bowl 60 contains molten glass 62 received from a forehearth (not shown). The molten glass 62 flows below a refractory tube 64 and is discharged through holes 66 in an orifice plate 68 as runners of molten glass. These runners are simultaneously sheared into discrete gobs by a Shear Mechanism and are delivered by a Gob Distributor to the parison mold assemblies. Needles 70 are individually movable upward and downward by Positioning Mechanisms driven by Positioner Motors to vary the size of the glass stream, and hence, the size of the gobs. Details of conventional, manually operable Positioning Mechanisms for raising or lowering the needles are disclosed in U.S. Pat. No. 4,551,163, dated Nov. 5, 1985.

It is within the last $\frac{3}{8}$" of plunger pressing stroke, that the mold cavity becomes completely filled in the parison forming process. To track the displacement of each plunger throughout this portion of the stroke, each Parison Mold Assembly includes a Displacement Probe Assembly having a linear potentiometer 50 (FIG. 1) secured to the plunger housing 30. As a plunger is displaced through this $\frac{3}{8}$", the piston 32 of that plunger will engage and displace a probe 52 to which is secured the potentiometer wiper 54. The displacement of this wiper 54 along the potentiometer element 56 changes the output of the linear potentiometer.

Figure 3:
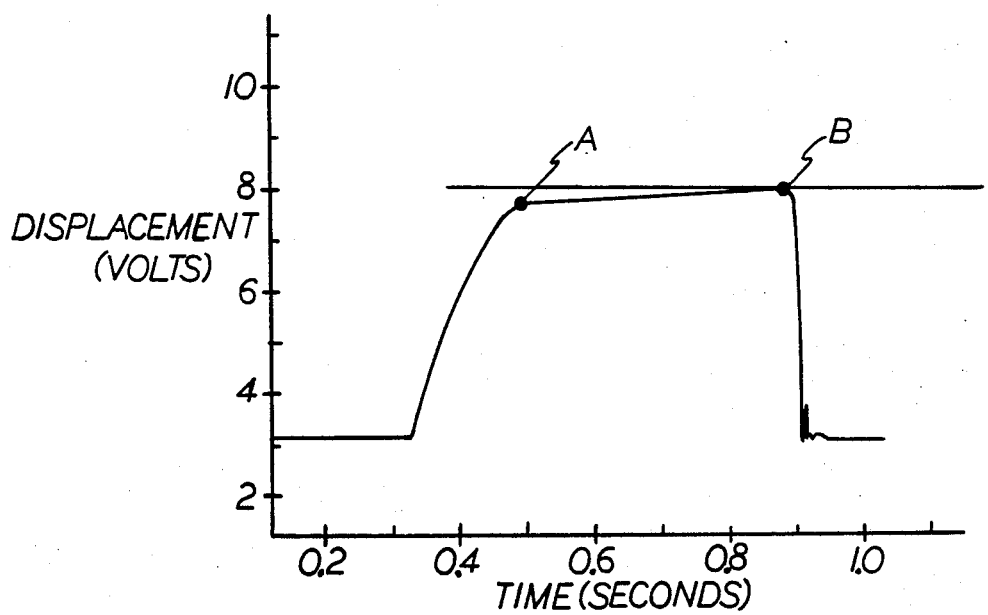
FIG. 3 is a graph illustrating the final portion of the movement of the mold assembly plunger in forming a parison.
Figure 2:
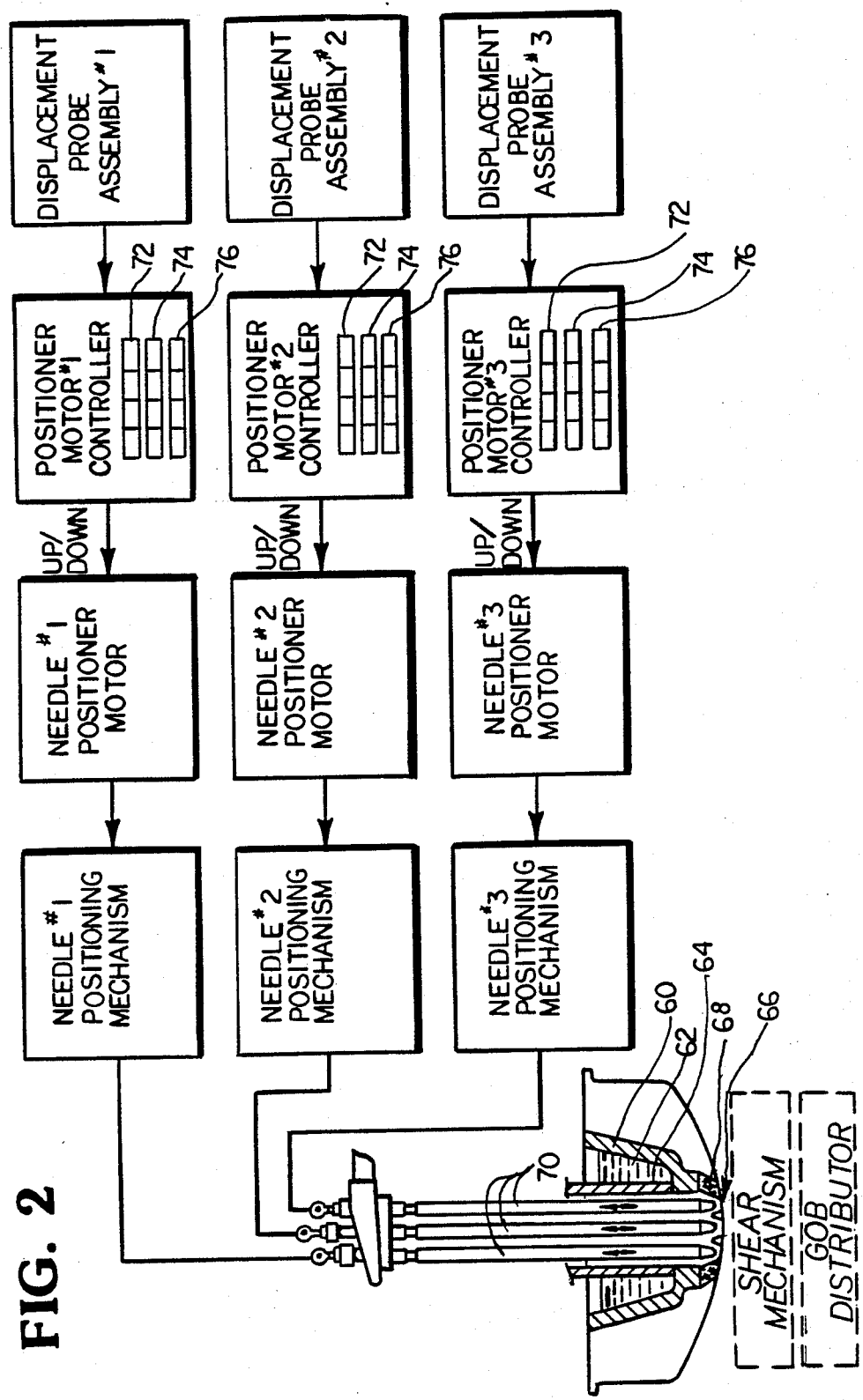
FIG. 2 is a partially schematic, partially diagrammatic illustration of a glass feeder mechanism which feeds gobs of molten glass to and receives positional data from a triple gob, individual section, glass forming machine.

FIG. 3 illustrates a plot of plunger displacement (voltage), as sensed by the probe, versus time, zero seconds being when the Plunger Controller commences plunger displacement (fires "plunger-up" solenoid, for example). This plot reveals a linear or constant velocity region between points A and B. Since the pressure is constant during this plunger advancement, the force exerted on the glass by the plunger remains constant. It is believed that point A is the point where the mold cavity has completely filled (the parison formation point) and that from point A to point B, the glass is cooling, and hence, shrinking. Point B corresponds to the time when the Plunger Controller commences plunger retraction (fires "plunger-down" solenoid, for example).

The Positioner Motor Controller for each needle receives positional data from its associated Displacement Probe Assembly, determines when Point A has been reached (has determined that the displacement curve has become linear), compares this location to a desired Point A location inputted via thumb wheel switches or the like 72 and drives the Positioner Motor to raise or lower the associated needle 70 until the actual and desired Point A locations are the same. Each Positioner Motor Controller may include a digital read out 74 of the actual Point A location. In a semi-automatic system, a thumb wheel switch or the like 76 may be provided for manually inputting needle offsets into the needle Positioner corresponding to the difference between digital read out 72 and thumb wheel switch 74 to relocate the associated needle to the desired Point A location. Such height adjustments to the needles 70 will maintain a constant parison weight, and will automatically adjust weights between multiple gobs such that all will be of equal value.

We claim:

1. A multi-gob glass forming machine comprising a plurality of parison mold assemblies each including a plunger displaceable from a retracted position to a fully inserted position, means for displacing each plunger from said retracted to said fully inserted position, said plungers advancing to a parison formation point where the mold cavity has become completely full and then to a fully inserted position as the formed parison cools, means for sensing the actual position of each of said plungers throughout at least the last portion of its displacement which includes the parison formation point and for determining the parison formation point for each of said plungers, and means for simultaneously delivering discrete gobs of molten glass to said parison mold assemblies including a feeder bowl having an orifice plate with a corresponding plurality of openings, and a corresponding plurality of needles individually displaceable to vary the volume of a stream of glass passing through the orifices, and shear means for simultaneously shearing a gob from each of the streams, computer means for determining when the displacement curve for each of said plungers becomes linear to locate the actual parison formation points for said plungers, manually inputtable means for defining the location where the parison formation point for each of said plurality of parison mold assemblies should be located, and means for comparing the location of the actual parison formation point as determined by the computer and the location of the desired parison formation point as inputted by the operator for each of said plungers, and individually displacing each of said needles to change the volume of the stream of glass controlled by said needle, and hence, of the gob formed therefrom to relocate the location of the actual parison formation point of the plunger to the desired location of the parison formation point as defined by the operator.

2. A multi-gob glass forming machine according to claim 1, wherein each of said sensing means comprises a linear potentiometer.

3. A multi-gob glass forming machine according to claim 1, wherein said defining means comprises manually settable input means.

* * * * *